H. E. COFFIN.
RADIUS ROD.
APPLICATION FILED APR. 13, 1908.

969,748.

Patented Sept. 6, 1910.
2 SHEETS—SHEET 2.

Witnesses
W. K. Ford
James P. Barry

Inventor
Howard E. Coffin
By Whitmore Hulbert Whitmore
Attys

UNITED STATES PATENT OFFICE.

HOWARD E. COFFIN, OF DETROIT, MICHIGAN.

RADIUS-ROD.

969,748.  Specification of Letters Patent.  Patented Sept. 6, 1910.

Application filed April 13, 1908. Serial No. 426,759.

*To all whom it may concern:*

Be it known that I, HOWARD E. COFFIN, a citizen of the United States of America, residing at Detroit, in the county of Wayne and State of Michigan, have invented certain new and useful Improvements in Radius-Rods, of which the following is a specification, reference being had therein to the accompanying drawings.

The invention relates to radius rods more particularly designed for use on motor vehicles having a chain drive.

It is the object of the present invention to reduce the stress upon the chain occasioned by the sudden starting or stopping of the vehicle, and further to cushion the blow produced by the sudden stopping of the wheels—as, for instance, where the vehicle is backed against a curb.

To this end the invention consists in the peculiar construction of a yieldable radius rod, and further in certain features of construction as more fully hereinafter set forth.

Figure 1:
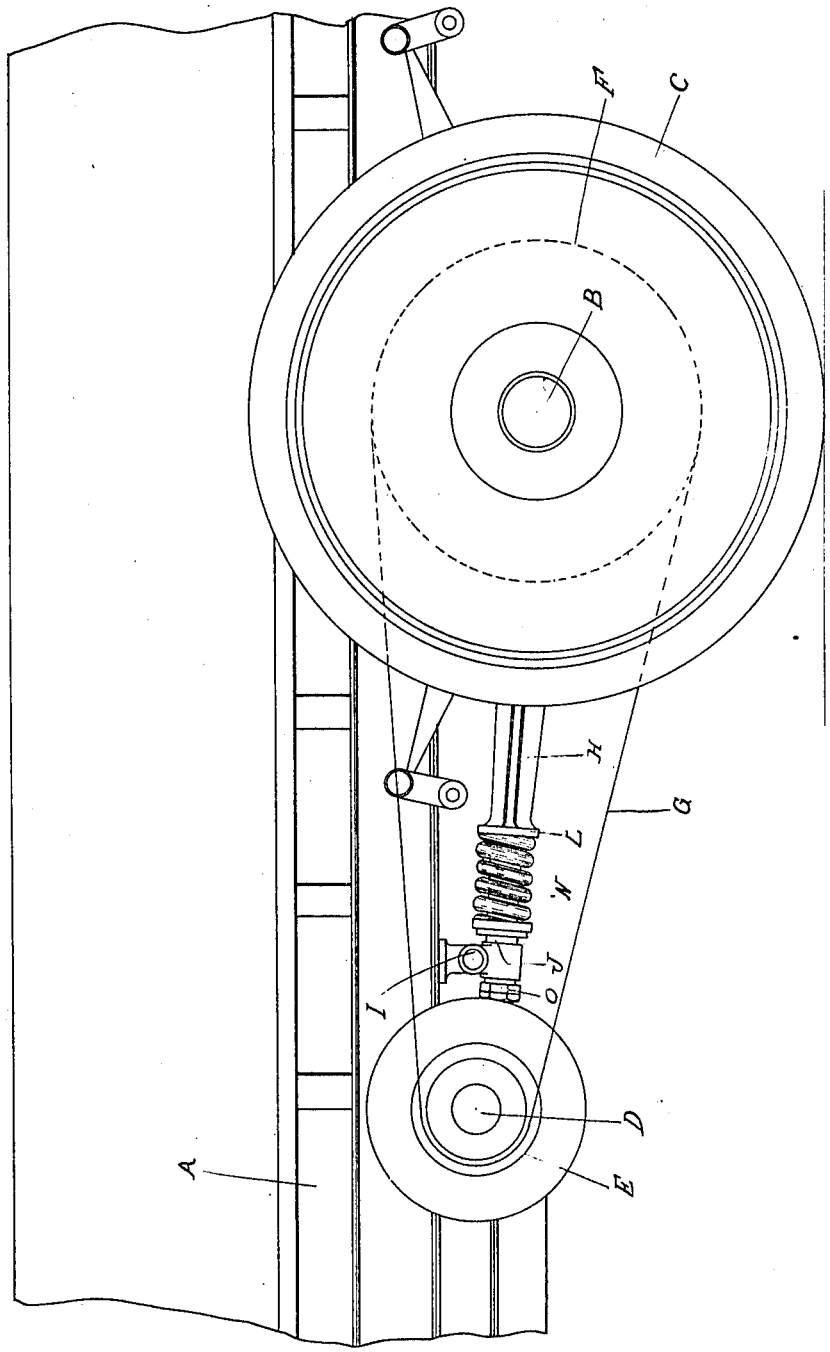
Figure 2:
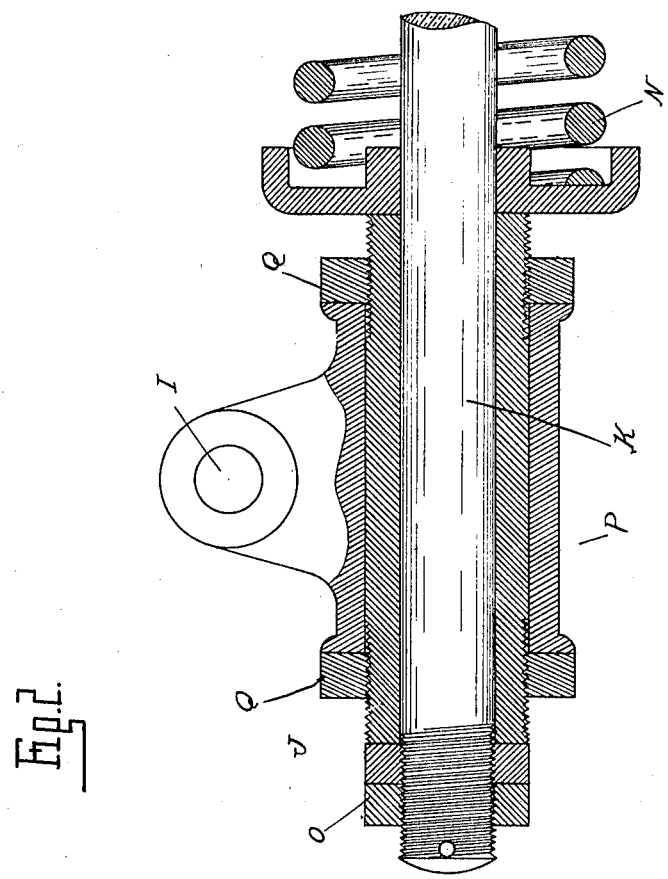

In the drawings—Figure 1 is an elevation of a portion of the frame and drive mechanism of a motor vehicle to which my improvement is applied; Fig. 2 is a longitudinal section through the pivot connection for the radius rod illustrating the adjustment for the chain.

A is the frame of the motor vehicle, B the drive axle, C the wheel mounted on said axle, D the drive shaft, E a sprocket thereon, F the sprocket on the axle, and G the sprocket chain, these parts being of any suitable construction.

H is a radius rod which at its free end is connected with the axle B, and at its opposite end is pivotally connected at I to a fixed bearing on the frame. To accomplish the objects of the invention, as above stated, the rod H is yieldable, and to this end the pivot I is connected to a sleeve J slidably engaging a portion K of the rod.

L is a shoulder formed upon the rod and N is a heavy coiled spring sleeved upon the portion K intermediate said shoulder and the sleeve J.

O is a collar preferably formed by lock nuts engaging a threaded portion of the rod beyond the sleeve J and forming a means for adjusting the tension of the spring N.

With the construction as thus far described, whenever a sudden stress is exerted upon the rod H the spring N will yield, but the tension of this spring is sufficient to normally hold the collar O against the sleeve J and maintain a constant distance between the pivot I and the axle. Thus the usual function of a radius rod is performed, while at the same time an excessive stress upon the chain is avoided.

In order to permit of adjusting the chain without altering the tension of the spring N the bearing for the pivot I is preferably adjustably secured to the sleeve J, and, as shown, a member P is slidably mounted upon the sleeve J and is locked in different positions of adjustment by nuts Q engaging threaded portions of the sleeve. This construction permits of changing the distance between the pivot I and axle without changing the adjustment of the collar O or the tension of the spring N.

What I claim as my invention is:

1. A radius rod comprising two members having a limited longitudinal adjustable engagement with each other, a spring for holding the members at the outer limit of their adjustment, and a bearing adjustably engaging one of said members whereby the length of the radius rod may be varied.

2. A radius rod comprising a member having a shoulder thereon and a projecting shank, a sleeve slidably engaging said shank, a spring interposed between said sleeve and said shoulder, a collar or stop on said shank upon the opposite side of said sleeve, and a bearing for said sleeve adjustably engaging the same.

3. The combination with a vehicle frame and an axle having a pivotal connection with said frame, of a radius rod pivotally secured at one end to said frame and at the other end to said axle, said rod comprising sections having a limited longitudinal adjustable engagement with each other, a spring for holding the members at the opposite limits of their adjustment, and a bearing adjustably engaging one of said members, whereby the length of the radius rod may be varied.

4. The combination with a vehicle frame and the axle, of a radius rod secured to the axle comprising a member having a shoulder thereon and a projecting shank, a sleeve slidably engaging said shank, a spring interposed between said sleeve and shoulder, a collar or stop on said shank upon the opposite side of said sleeve, and a bearing for said sleeve adjustably engaging the same, said bearing being pivotally secured to the frame.

In testimony whereof I affix my signature in presence of two witnesses.

HOWARD E. COFFIN.

Witnesses:
  NELLIE KINSELLA,
  JAMES P. BARRY.